Patented Jan. 6, 1953

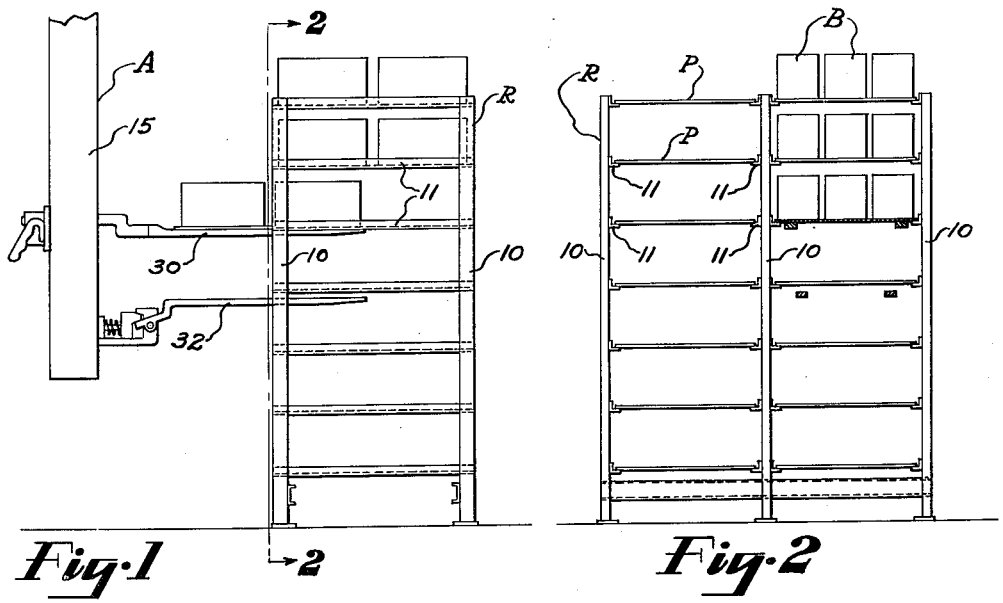
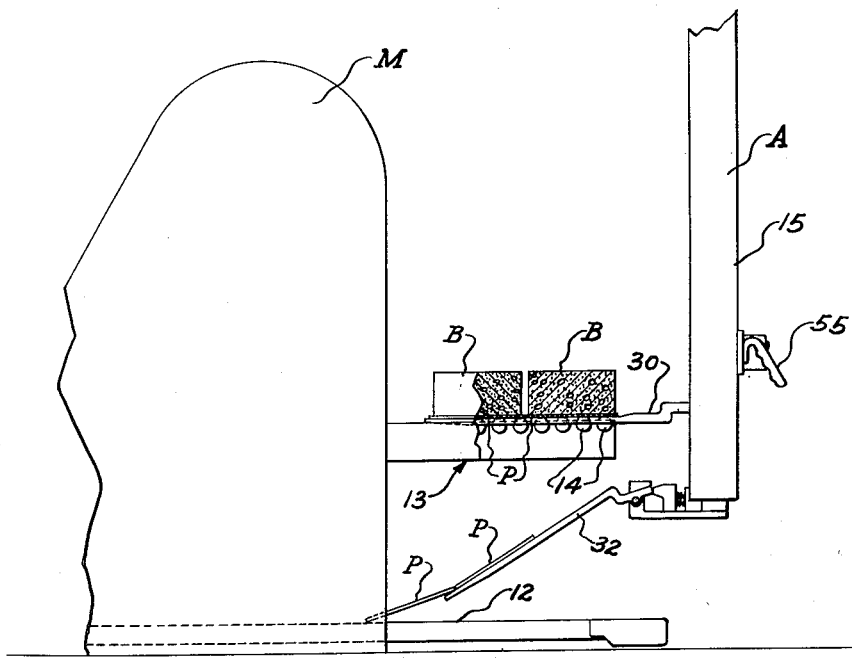

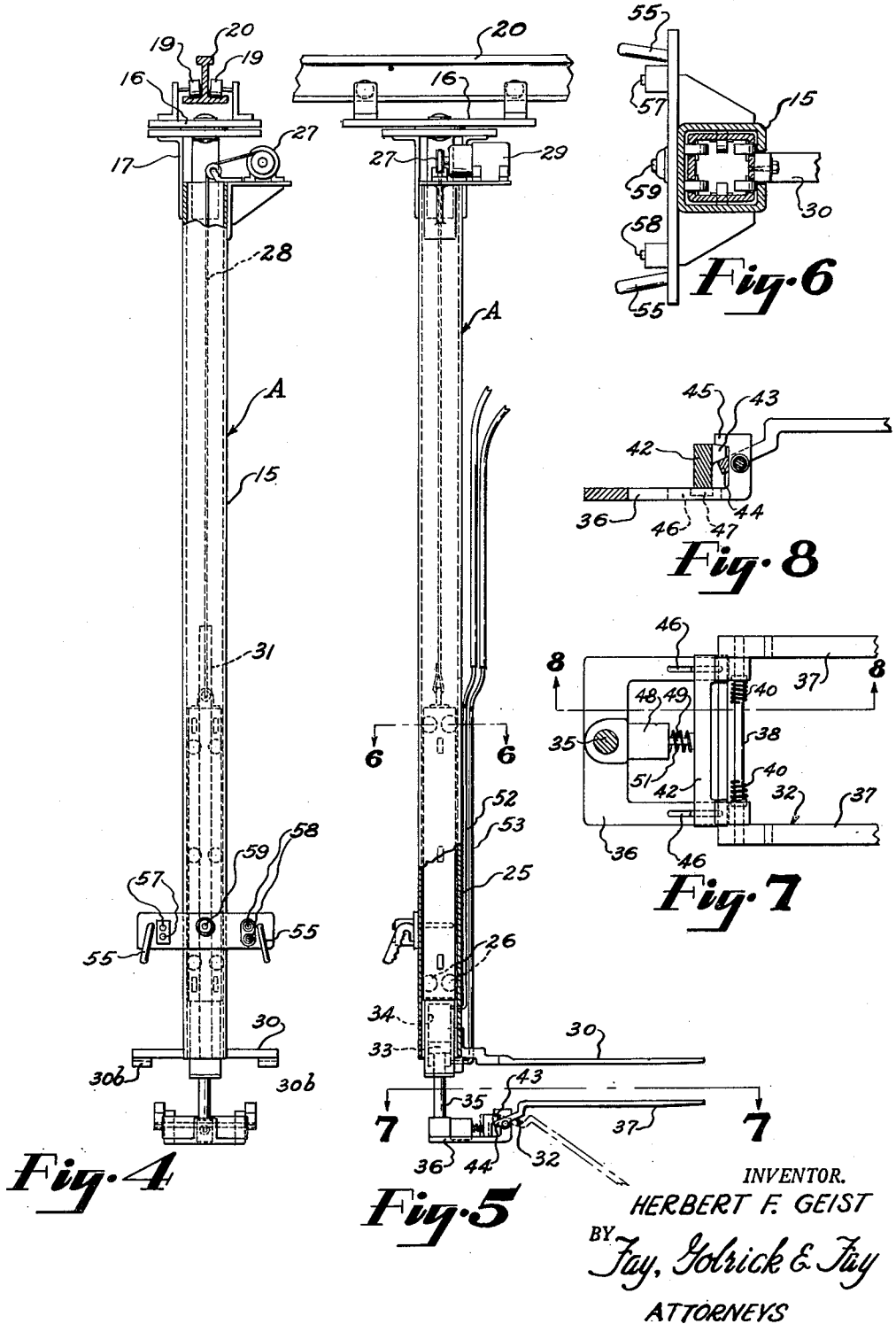

2,624,470

UNITED STATES PATENT OFFICE 2,624,470

PALLET HANDLING APPARATUS

Herbert F. Geist, Lakewood, Ohio

Application February 10, 1949, Serial No. 75,519

4 Claims. (Cl. 212—135)

The present invention relates to a power operated pallet handling apparatus capable of handling at least two pallets in tiered relation at one time, whereby one pallet may be picked up while the other one is being deposited.

An object of the invention is to provide a power operated apparatus for transporting a loaded and unloaded pallet in tiered relation between a storage rack and a block forming machine, for example, and which is capable of depositing a pallet on one tier of the rack while picking up a pallet from another tier of the rack.

Another object of the invention is to provide a pallet handling apparatus capable of depositing pallets on one level while simultaneously picking up pallets from another level.

A still further object of the invention is to provide a pallet handling apparatus having tiered carrying forks, one of which is capable of movement toward and away from the other whereby relatively widely spaced tiered pallets may be handled simultaneously or the forks may be inserted beneath one pallet where the clearance beneath the pallet is close.

A further object of the invention is to provide an apparatus of the character described having manual control members located adjacent to the pallet carrying members, the pallet carrying members being power operated in a vertical direction under control of said members while the latter members are fixed relative to vertical.

Other objects and advantages of the invention will be apparent from the following description of a preferred form of the invention, reference being made to the accompanying drawings wherein:

Fig. 1 is a side view in elevation of a rack for supporting pallets loaded with building blocks, and a portion of a pallet handling apparatus;

Fig. 2 is a view taken on line 2—2 of Fig. 1;

Fig. 3 is a side view of a portion of the pallet handling apparatus showing the apparatus depositing empty pallets in the magazine of a block making machine and about to pick up two pallets carrying building blocks;

Fig. 4 is a view in elevation showing the principal parts of the pallet handling apparatus, certain parts being broken away for the sake of clarity.

Fig. 5 is a view similar to that of Fig. 4 but taken at 90° thereto;

Fig. 6 is a view in section taken on line 6—6 of Fig. 5 but on a larger scale;

Fig. 7 is a view taken substantially on line 7—7 of Fig. 5; and

Fig. 8 is a view taken on line 8—8 of Fig. 7.

The present invention relates to a pallet handling apparatus which is particularly suitable for use in the building block industry, although its use is not limited thereto. In the building block industry it is the practice to form building blocks by a machine which deposits the formed blocks on flat pallets and the pallets are then removed with the blocks thereon to racks and the racks then placed in a curing room for hardening the blocks. The pallets per se are relatively heavy and difficult to handle manually and power operated devices have been provided for this purpose. In order to expedite the handling of the pallets, both loaded and empty, to and from the machine and racks, it is desirable to place a loaded pallet on one tier of the rack and at the same time remove an empty pallet from the next lower tier, and to pick up a loaded pallet from the block forming machine while depositing empty pallets from the rack into the magazine of the machine. Such operations provide considerable economy in the block forming process. Another consideration is to provide a pallet handling apparatus which, in addition to handling tiered pallets, is capable of manipulation beneath the lowermost tier of the racks wherein the clearance below the pallet is relatively close.

By my invention I have provided a pallet handling apparatus which performs the functions just described in an efficient and novel manner.

Referring now to Figs. 1 and 2 of the drawings, a rack R is shown which is adapted to support tiers of pallets P. During the block manufacturing process the rack is placed adjacent to the block forming machine and the empty pallets are removed and placed in the magazine of the machine and pallets carrying the unused blocks from the machine are placed on the rack. When the rack is loaded it is transported by truck into a curing room where the blocks are cured. Subsequently the rack is moved to the block storage area where the blocks are removed, and the rack bearing empty pallets is returned to the forming machine. The rack R is formed of vertical posts 10 interconnected by L shaped strips 11 which form spaced parallel ledges for supporting the pallets P along opposite edges and in tiers.

In Fig. 3, I have shown a block forming machine M, which type of machine is well known in the art and it is adapted to form building blocks B of concrete, cinder or other suitable material, the blocks being deposited by the machine on to the pallets P. The machine receives empty pallets at 12 and discharges loaded pallets at 13, the discharge platform comprising two spaced arms carrying rollers 14 which support the pallets along opposite edges.

The pallet handling apparatus indicated generally at A, is adapted to remove empty pallets from the rack and deposit them in the machine M and during the depositing of the pallets the apparatus is adapted to remove the loaded pallets P from the machine and to transfer them to the empty tier of the rack R. At the time the pallets are deposited on the rack the empty pallet in the next lower tier is removed for transfer to the machine M.

Referring more particularly to the apparatus A, the latter comprises a vertical support member 15 which consists of a hollow metal column substantially square in cross section and which is supported at its upper end to a monorail truck 16 by a bracket 17. The bracket is pivotally attached to the truck so that the member 15 may be rotated about its longitudinal axis. The truck 18 has wheels 19 mounted on a monorail 20 which is suspended overhead by any suitable structure, not shown, so that the member 15 may travel along the monorail between the rack R and the machine M. Preferably, the monorail is supported on a swinging structure whereby the rail may be swung in an arc the plane of which is horizontal.

The member 15 forms a trackway for a fork supporting carrriage 25 mounted therein, which carriage consists of a tubular member rectangular in cross section and having guide wheels 26 mounted thereon which engage the inner walls of the member 15 to guide the carriage vertically inside the member 15 with a minimum of friction. The carriage 25 is adapted to be raised and lowered by a power driven drum 27 through the medium of a cable 28 wound on the drum and attached to the carriage. The drum 27 is adapted to be operated by a reversible electric motor indicated at 29 and a brake is preferably provided for automatically locking the drum against rotation when the motor is inoperative.

A bifurcated fork 30 is rigidly attached to the lower portion of the carriage 25, and the stem 30a of the fork member is adapted to project through a slot 31 formed in the member 15 and extending from the lower end of the member to the maximum height desired for the fork. The fork 30 includes two horizontally extending prongs which are interconnected by a yoke member and the prongs are adapted to be inserted beneath pallets for transporting the latter.

A second pallet carrying fork 32 is mounted on the carriage 25 beneath the fork 30 and it is adapted to be moved vertically relative to the carriage 25 and fork 30. This is accomplished by mounting the fork 32 to a piston 33 which is adapted to reciprocate in a pneumatic cylinder 34 carried at the lower portion of the carriage 25. The fork 32 is attached to the lower end of a piston rod 35 connected to the piston 33.

The fork 32 is capable of tilting downwardly for sliding pallets therefrom as is illustrated in Fig. 3, and for this purpose the fork comprises a yoke 36 which is connected to piston rod 35 and the prongs 37 of the fork are pivotally mounted to the yoke by a rod 38 which is journalled in the arms of the yoke and keyed to the prongs. Normally, the prongs 37 are supported in a horizontal position by coil springs 40, one of the ends of which are anchored to the rod 38 and the other ends of which are attached to the prongs. Also, the prongs are latched in the horizontal position by a latch member 42 having overhanging shoulder portions 43 which are adapted to project between lugs 44 on the prongs adjacent to the pivoted ends of the latter and ledge portions 45 on yoke 36 which overhang lugs 44. The latching member 42 is mounted for sliding movement on the yoke 36 and guide slots 46 are provided in the yoke members 36 for receiving keys 47 on the latch 42 which cooperate with the walls of the slots for guiding the latch. The latch is adapted to be moved from the fork latching position by a solenoid 48, the latch being connected to the armature of the solenoid by rod 49 so that upon energization of the solenoid the latch is drawn toward the solenoid. The latch is urged to its latching position by a coil spring 51 interposed between the solenoid and latching member and surrounding the rod 49. The solenoid is controlled by the operator as is more fully described hereinafter.

The operation of piston 33 is effected by pneumatic pressure admitted to the cylinder 34 by pipes 52 and 53 which enter at the top and bottom of the cylinder respectively. The pipes 52 and 53 are connected to a source of air pressure, not shown, by flexible tubing, and the operator may selectively connect the pipes with the air pressure or exhaust the same as desired, through the medium of conventional solenoid valves, not shown.

The member 15 is provided with piston grip type handles 55 by which the member may be manually moved along the monorail 20 by the operator. The handles are preferably mounted at a height convenient to the average man and control buttons 57 and 58 are mounted adjacent the handles for operation by the operator's thumbs. The carriage 25 may be raised and lowered by the operator by the control buttons 57, which cause operation of the motor 29 in one direction or the other according to which button is depressed. The electrical circuit for controlling the motor is not shown inasmuch as such circuits are well known. The operation of piston 33 is controlled by the buttons 58 which control the solenoid air valves mentioned hereinbefore with respect to pipes 52 and 53. The depression of one button causes elevation of the piston 33, and the attached fork 32, while depression of the other button causes lowering of the piston. The latch releasing solenoid 48 is controlled by button 59 which is also located convenient to the operator's hand grips.

The operation of the pallet handling apparatus in the processing of building blocks is as follows: One or more racks R supporting tiers of empty pallets is disposed more or less adjacent to the block forming machine and in the line of travel of the member 15. The operator grasps the handles 55 and moves the apparatus A to a point in front of the racks and inserts the lower fork 32 beneath the uppermost pallet and then raises the fork either by operation of the piston 33 or the drum 27. The member 15 is then moved along rail 20 to a point in front of the machine M where the fork 32 is lowered over the pallet receiving portion 12 whereupon the magnet 48 is energized to release prongs 37, which due to the weight of the pallets, tilt downwardly and spill the pallets onto the machine. At the same time fork 30 is inserted beneath the loaded pallets on the platform 13 and then the carriage 25 is elevated to lift the loaded pallets from the machine. The member 15 is then moved along the monorail back to the rack where the loaded pallets are deposited on the uppermost tier and the lower fork 32 is at the same time inserted beneath the next lower empty pallet whereupon piston 33 is raised for lifting the empty pallet from the rack from whence it is carried and deposited on the machine as described above. When loaded pallets are deposited on the lowermost shelf of the rack the position of the lower fork is adjusted by piston 33 so that it can be inserted beneath the lowermost pallet although the clearance beneath the pallet is relatively close. This is accomplished by raising the lower pallet to substantially the same level as the upper fork 30.

It will be noted that the operator is at all times in a position favorable to closely observe and control the handling of the pallets and by providing the handles and controls on the member 15 in fixed relation thereto the operator need not raise and lower his hands according to the level of the forks.

It will be apparent that by my invention I have provided a relatively simple apparatus for economically handling a plurality of pallets with a minimum of time and effort.

Although I have described but one form of the invention, it will be apparent that other forms might be adopted, all falling within the scope of the claims which follow.

I claim:

1. A pallet handling apparatus comprising, a suspended support member having a vertical trackway; a carriage mounted to the trackway for vertical movement therealong; power means for raising and lowering the carriage along the trackway; a pallet fork extending laterally from said carriage; a second pallet fork pivotally mounted to said carriage below the first mentioned fork; power means mounted to said carriage for raising and lowering the lower fork relative to the upper fork at any stage of elevation of the upper fork and latching means for releasably locking said second fork in a horizontal position.

2. A pallet handling apparatus comprising, a suspended support member having a vertical trackway; a carriage mounted to the trackway for vertical movement therealong; power means for raising and lowering the carriage along the trackway; a pallet fork extending laterally from said carriage; a second pallet fork mounted below the first mentioned fork; power means mounted to said carriage for raising and lowering said second fork relative to the other fork, said second fork being pivotally mounted to said power means whereby the load supporting ends of the fork may be tilted downwardly from horizontal; and latching means for releasably locking said second fork in a horizontal position.

3. A pallet handling apparatus comprising, a monorail carriage movable on a horizontal rail; a support member having a vertical trackway, said support member being pivotally suspended from said monorail carriage; a carriage mounted to the vertical trackway for vertical movement therealong; power means for raising and lowering the carriage along the trackway; a pallet fork extending laterally from said carriage; a second pallet fork pivotally movably mounted on said carriage in spaced relation to the first mentioned fork; power means mounted to said carriage for raising and lowering the lower fork relative to the upper fork independently of the movement of the carriage on said trackway and a latching means for maintaining the forks in a horizontal position.

4. A pallet handling apparatus comprising a monorail truck movable along a horizontal rail; a support member having a vertical trackway, said support member being pivotally suspended from said monorail truck; a carriage mounted to the trackway for vertical movement therealong; power means for raising and lowering the carriage along the trackway; a pallet fork extending laterally from said carriage; a second pallet fork mounted below the first mentioned fork; power means mounted to said carriage for raising and lowering said second fork relative to the other fork, said second fork being pivotally mounted to said power means whereby the load supporting ends of the fork may be tilted downwardly from horizontal; and latching means for releasably locking said second fork in a horizontal position.

HERBERT F. GEIST.

REFERENCES CITED

The following references are of record in the file of this patent:

UNITED STATES PATENTS

| Number | Name | Date |
| --- | --- | --- |
| 744,316 | Eitle | Nov. 17, 1903 |
| 1,094,645 | Eichinger | Apr. 28, 1914 |
| 1,487,571 | Hurwitz | Mar. 18, 1924 |
| 1,774,863 | Young | Sept. 2, 1930 |
| 1,840,327 | Paulsen | Jan. 12, 1932 |
| 2,415,892 | Koehl et al. | Feb. 18, 1947 |
| 2,463,675 | Beyerstedt | Mar. 8, 1949 |
| 2,496,399 | Lesser | Feb. 7, 1950 |
| 2,535,961 | Schutt | Dec. 26, 1950 |

FOREIGN PATENTS

| Number | Country | Date |
| --- | --- | --- |
| 285,450 | Germany | June 30, 1915 |